July 10, 1956 W. J. LINN 2,754,184
LIQUID FUEL ATOMIZERS
Filed July 12, 1954
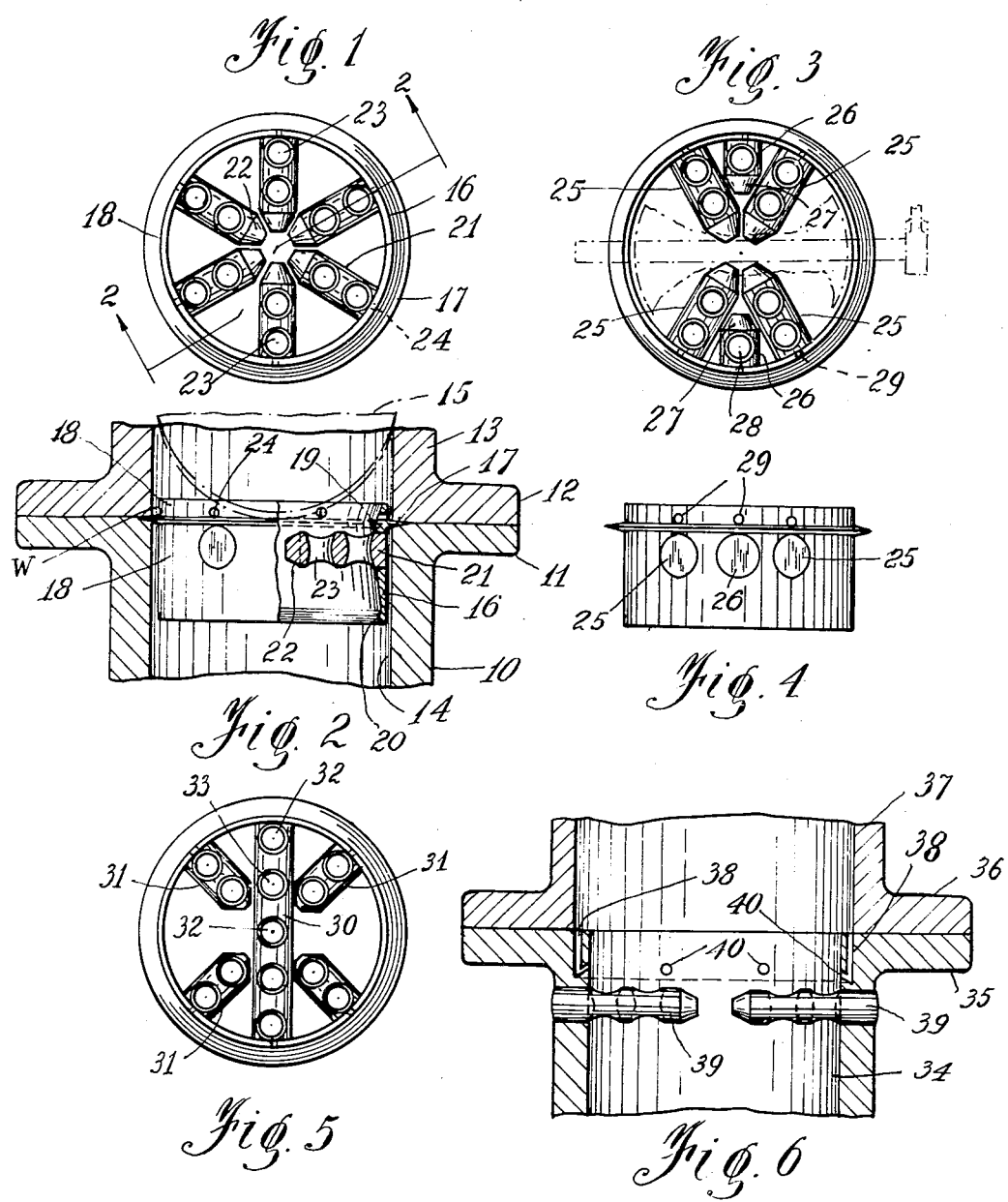
William J. Linn,
INVENTOR.
BY Ralph Donath
Attorney United States Patent Office 2,754,184
Patented July 10, 1956

2,754,184

LIQUID FUEL ATOMIZERS

William J. Linn, Pittsburgh, Pa.

Application July 12, 1954, Serial No. 442,680

2 Claims. (Cl. 48—180)

This invention relates to liquid fuel atomizers and mixers and particularly to devices of this type used in connection with the fuel and air charging ducts in carburetors and manifolds of internal combustion engines for improving the degree of mixing and the quality of the explosive mixture delivered to the combustion chamber.

A great variety of devices have been suggested for this purpose, none of which, however, completely and successfully atomizes the liquid fuel so as to prevent raw and unatomized liquid fuel from entering the combustion chambers of the engine. Droplets of fuel, unmixed with air, are undesirable in the combustion chamber since they tend to pass around the piston rings during the compression stroke of the engine and to pass into the crankcase where they dilute the oil, reducing its lubricating qualities, causing excessive carbon build up and excessive wear. These difficulties can be eliminated by a more complete atomization of the fuel.

An object of the invention is to eliminate these difficulties by atomizing all of the liquid fuel in the air and fuel charging duct.

Another object of the present invention is to provide means for collecting the droplets of liquid fuel which collect on the walls of the fuel and air duct and return them into the duct as an atomized fuel and air mixture.

A further object of this invention is to provide means for creating added turbulence and added commingling of the returned fuel and air with the fuel and air stream.

Another object of the invention is to provide means for atomizing the portion of the fuel and air stream forming the central core or axis of the stream.

A further object of this invention is to provide a flow changing means for alternately accelerating and decelerating the fuel and air stream and a diffusing and atomizing mechanism cooperating therewith to atomize the fuel through the entire cross section of the fuel and air charging duct.

Other objects, advantages and features of the invention will become apparent from a consideration of the following description and the accompanying drawings, in which Figure 1 is a top plan view of a combination flow velocity changing means and atomizer according to this invention.

Figure 2 is a section on the line 2—2 of Figure 1.

Figure 3 is a top plan view of a second embodiment of this invention.

Figure 4 is a side elevation of the embodiment of Figure 3.

Figure 5 is a top plan view of a third embodiment of the present invention.

Figure 6 is a vertical section through a fuel and air charging duct showing still a fourth embodiment of this invention.

Referring to the drawings there is illustrated a conventional manifold inlet 10 having a flange 11 connected to a flange 12 of a carburetor barrel 13 thereby forming a passage 14 hereinafter termed "fuel and air charging duct." The butterfly valve 15 of the carburetor is located in the carburetor body between the flange 12 and the fuel jet (not shown) immediately above it.

Carburetor manifold combinations of this type are generally old and will at best supply only partially atomized fuel to the engine. Such a combination is subject to all of the evils mentioned above as characteristic of ordinary carburetors.

In a preferred form of this invention a flow velocity changing means 16 is inserted into the air and fuel charging duct 14 by means of a flange 17 whose outer extremity is feathered to insert between the inner edges of the carburetor flange 12 and the manifold flange 11. The flow velocity changing means 16 has an outer wall 18 from which flange 17 projects radially. The outer wall 18 and flange 17 forms a well $w$ with the inner wall of the carburetor. This well collects the condensed liquid fuel which gathers on the internal walls of the carburetor.

The flow velocity changing means is in the form of a venturi having a restricting ridge 19 intermediate its ends and an exit ridge 20 immediately adjacent the exit end of the flow velocity changing means. These ridges restrict the flow of gases which cause them to move faster through the restricted areas than on either side and at the same time creates turbulence in the gases leaving the ridges thereby causing the fuel and air to be more thoroughly commingled.

A plurality of diffuser members 21 are fixed in the wall of the flow velocity changing means immediately below the restricting ridge 19. These diffuser members extend radially inwardly from the wall of the flow velocity changing means at spaced intervals to a point spaced from the axis of the flow velocity changing means. Each diffuser member is provided with a frusto conical end 22. The frusto conical ends 22 lie closely adjacent each other and form a hexagonal restricting ridge at the axis of the flow velocity changing means. Each diffuser member 21 is provided with one or more venturi openings 23 passing therethrough parallel to the axis of the flow velocity changing means. An opening 24 is provided through the wall 18 of the well directly above each of the diffuser members 21 and above the restricting ridge 19 so that liquid fuel collected in the well is discharged into the flow velocity changing means directly above the restricting ridge and the diffuser member.

In Figures 3 and 4 there is illustrated another embodiment of this invention in which two pairs of radially extending diffuser members 25 spaced 60 degrees apart are placed on opposite sides of the center line of the flow velocity changing means. Each of these diffuser members 25 is identical with the member 21 of the embodiment shown in Figures 1 and 2. A short or stub diffuser member 26 is placed in the wall of the diffuser member between each pair to bisect the angle between each pair of diffuser members. The stub diffuser member 26 is formed with a frusto conical tip 27 extending parallel to the sides of the diffuser members. A venturi opening 28 is placed intermediate the ends of this stub diffuser. Openings 29 through the wall of the flow changing means above each diffuser means carries the liquid fuel collected in the well from the well to discharge into the interior of the flow velocity changing means. The shaft for the butterfly valve is preferably placed transverse to the line bisecting the angle between the diffuser members (see dot and dash lines in Figure 3).

In Figure 5 is shown still a third embodiment in which a cylindrical diffuser member 30 extends diametrically across the interior of the flow velocity changing means and is flanked on each side by a diffuser member 31 similar to diffuser member 21 described above. The diffuser member 30 is provided with a venturi opening 32 at the axis of the flow velocity changing means and with spaced apart venturi openings 33 between the central openings 32 and the side wall of the flow velocity changing means. In this embodiment the butterfly valve shaft is placed transverse to the diametrical diffuser member.

In Figure 6 is shown an embodiment of this invention having an air and fuel charging duct 34 having a flange 35 connected to a flange 36 of a carburetor barrel 37. A well 38 is milled into the upper end of the fuel and air charging duct which is smaller in diameter than the internal diameter of the carburetor barrel. Diffuser means 39 identical with those of Figures 1 and 2 are inserted in the walls of the fuel and air charging duct 34 and openings 40 are drilled through the wall of the fuel and air charging duct into the well 38 above each diffuser member.

In operating an internal combustion engine having the device of this invention, the liquid fuel is introduced into the carburetor barrel and fuel and air charging duct from the fuel jet in the usual manner. The fuel is there picked up by the stream of air and carried along the duct. A considerable portion of the fuel remains in the form of large drops, many of which impinge upon the walls of the duct. This portion of the fuel is collected in the well formed by the flange 17 and wall 18 and reintroduced into the fuel and air stream through the openings 24 directly above the diffuser members. The fuel and air mixture which passes along the duct enters the venturi where it is alternately accelerated and decelerated by passing through between the ridge 19. This alternate acceleration and deceleration causes the flow of air and fuel to become turbulent, especially along the periphery of the stream thereby mixing the fuel and air and breaking the fuel into smaller particles.

This breaking up of the fuel is, however, insufficient to produce the thorough mixture necessary to complete efficient combustion. In order to provide this, the fuel is, in the present invention, carried through the venturi where it strikes the radial diffuser members 21. A part of the gas mixture passes around the surfaces of each diffuser member, a part passes through the venturi openings which are spaced along each of the diffuser members and a part passes through the axial opening formed by the ends of the radially extending diffuser members. This division of flow of the gas mixture provides four very significant effects, (1) the effect of the main venturi ridge 19 and the auxiliary ridge 20, (2) the effect of a central venturi, formed by the ends of the diffuser members, (3) the effects of the side by side venturi in the diffuser member, and (4) the flow alteration by the body of the diffuser member itself. The various effects cooperate to produce a commingling of fuel and air such as has been heretofore impossible and results in surprisingly improved engine performance.

The turbulent currents caused by the diffuser member, its venturi, the main venturi, and the central venturi cooperate to set up compounded turbulence in the interior of the duct and venturi. Such increased turbulence acts to atomize the fuel and to intermix it with air to an extent heretofore impossible to attain.

Although several presently preferred embodiments of this invention have been illustrated, it is to be understood that it may be otherwise embodied within the scope of the following claims.

I claim:

1. A liquid fuel atomizer for a fuel and air charging duct of an internal combustion engine comprising a main flow velocity changing means for alternately accelerating and decelerating the air and fuel mixture moving in said duct whereby peripheral turbulence is created in the fuel and air mixture along the walls of said duct, and a plurality of radially extending spaced apart substantially cylindrical diffuser members fixed in the wall of the flow velocity changing means, said diffuser members being spaced equi-distant apart and lying in the same plane transverse to the axis of the main flow velocity changing means, each diffuser member terminating short of the axis of the main flow velocity changing means and having the ends thereof adjacent said axis formed as frusto conical surfaces whereby an axial flow velocity changing means is formed, said diffuser members each having at least one flow velocity changing means through the body thereof intermediate the ends and parallel to the axis of the main flow velocity changing means.

2. A liquid fuel atomizer for a fuel and air charging duct of an internal combustion engine comprising a tubular sleeve adapted to be disposed in the duct between the carburetor and the engine, said sleeve having attachment means for mounting in said duct defining a well adjacent the periphery of the duct, a venturi tube integral within the tubular sleeve whereby peripheral turbulence is created in an air and fuel mixture moving in the duct and a plurality of radially extending spaced apart substantially cylindrical diffuser members are spaced equi-distant apart around the wall of the sleeve and in the same plane, each such diffuser member terminating short of the axis of the integral venturi tube in the sleeve and having their ends adjacent said axis formed as frusto-conical surfaces whereby an axial flow velocity charging means is formed, said diffuser members each having at least one venturi through the body thereof intermediate its ends and parallel to the axis of the sleeve.

References Cited in the file of this patent

UNITED STATES PATENTS

| 1,503,371 | Meyer | July 29, 1924 |
| 2,589,946 | Linn | Mar. 18, 1952 |
| 2,614,037 | Linn | Oct. 14, 1952 |

FOREIGN PATENTS

| 838,154 | France | Nov. 28, 1932 |
| 958,538 | France | Sept. 12, 1949 |
| 318,379 | Italy | June 11, 1934 |